US006178915B1

(12) United States Patent
Salandra

(10) Patent No.: US 6,178,915 B1
(45) Date of Patent: Jan. 30, 2001

(54) EMERGENCY RESCUE AID SYSTEM

(76) Inventor: Anthony J. Salandra, 1396 Springwood Trace, SE., Warren, OH (US) 44484-3145

( * ) Notice: Under 35 U.S.C. 154(b), the term of this patent shall be extended for 0 days.

(21) Appl. No.: 09/179,065

(22) Filed: Oct. 26, 1998

(51) Int. Cl.[7] ........ B64B 1/40
(52) U.S. Cl. ........ 116/210; 116/DIG. 8
(58) Field of Search ........ 116/210, DIG. 7, 116/DIG. 8, DIG. 9; 174/36

(56) References Cited

U.S. PATENT DOCUMENTS

| | | | | |
|---|---|---|---|---|
| 3,253,573 | * | 5/1966 | Ashline | 116/210 |
| 3,547,073 | * | 12/1970 | Colandrea | 116/210 |
| 3,592,157 | * | 7/1971 | Schwartz | 116/210 |
| 3,594,491 | * | 7/1971 | Zeidlhack | 174/36 |
| 3,727,229 | * | 4/1973 | Clinger et al. | 116/210 |
| 3,941,079 | * | 3/1976 | McNeill | 116/210 |
| 3,964,427 | * | 6/1976 | Murphy | 116/210 |
| 4,305,140 | * | 12/1981 | Massa | 116/210 |
| 4,433,638 | * | 2/1984 | Ashline | 116/210 |
| 4,586,456 | * | 5/1986 | Forward | 116/210 |
| 4,872,414 | * | 10/1989 | Asquith et al. | 116/210 |
| 5,095,845 | * | 3/1992 | Murphy | 116/210 |
| 5,414,211 | * | 5/1995 | Chan | 174/36 |
| 5,473,113 | * | 12/1995 | Aldissi | 174/36 |

* cited by examiner

*Primary Examiner*—Andrew H. Hirshfeld

(57) ABSTRACT

A emergency rescue aid system including a waistpack having an open interior with a removable flap and a waistband attached thereto for coupling with a user. At least one balloon is positioned within the waistpack. Each balloon includes a netting positionable therearound. A light is positioned within the waistpack and is positionable on the upper extent of each balloon. A reel of wire is provided. The wire having a central electrical power cable, an exterior woven wire and an intermediate electrically insulating shield, adapted to couple at its upper end the light and to be supported on the reel at its lower end. At least one helium container is positioned on the waistpack. The helium container being adapted to fill at least one balloon to effect its rising upon being inflated.

1 Claim, 5 Drawing Sheets

EMERGENCY RESCUE AID SYSTEM

BACKGROUND OF THE INVENTION

1. Field of the Invention

The present invention relates to a emergency rescue aid system and more particularly pertains to increasing the safety of outdoor enthusiasts who may be at risk of being lost or injured in remote areas.

2. Description of the Prior Art

The use of rescue aids of known designs and configurations is known in the prior art. More specifically, rescue aids of known designs and configurations heretofore devised and utilized for the purpose of reducing the risk of people in perilous situations are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,721,983 to Sherer discloses a Signal Balloon. International Application Number PCT/BR78/000002 to Vitali discloses an Emergency Rescue Balloon Kit. U.S. Pat. No. 3,154,050 to Hanson discloses an Emergency Signal Apparatus. U.S. Pat. No. 5,262,768 to Florer discloses a Rescue Beacon Apparatus. Lastly, U.S. Design Pat. No. Des. 335,468 to Cumming discloses a Balloon Distress Signal Kit.

While these devices fulfill their respective, particular objectives and requirements, the aforementioned patents do not describe emergency rescue aid system as described herein.

In this respect, the emergency rescue aid system according to the present invention substantially departs from the conventional concepts and designs of the prior art, and in doing so provides an apparatus primarily developed for the purpose of increasing the safety of outdoor enthusiasts who may be at risk of being lost or injured in remote areas.

Therefore, it can be appreciated that there exists a continuing need for a new and improved emergency rescue aid system which can be used for increasing the safety of outdoor enthusiasts who may be at risk of being lost or injured in remote areas. In this regard, the present invention substantially fulfills this need.

SUMMARY OF THE INVENTION

In view of the foregoing disadvantages inherent in the known types of rescue aids of known designs and configurations now present in the prior art, the present invention provides an improved emergency rescue aid system. As such, the general purpose of the present invention, which will be described subsequently in greater detail, is to provide a new and improved emergency rescue aid system and method which has all the advantages of the prior art and none of the disadvantages.

To attain this, the present invention essentially comprises an emergency rescue aid system adapted to be carried by outdoor enthusiasts who may be at risk of being lost or injured in remote areas. The system comprises, in combination a waistpack having an open interior with a removable flap and a waistband attached thereto for coupling with a user. The system also includes a pair of balloons positioned within the waistpack. Each balloon has in association therewith a nylon netting positionable therearound and each balloon has indicia thereon of a reflective material to indicate help is needed. A halogen or strobe light is positioned within the waistpack and positionable on the upper extent of each balloon. A reel of wire is provided and has a central electrical power cable, an exterior woven wire and an intermediate electrically insulating shield. The wire is about 500 feet in length and is adapted to couple at its upper end the light and to be supported on the reel at its lower end. A pair of helium containers are positioned on the waistpack, each helium container adapted to fill one balloon to effect its rising upon being inflated. A pair of batteries are positioned within the waistpack. Each battery is adapted to be coupled to the lower end of the power cable for illuminating the light when the balloon is raised. A pair of extra lightbulbs are positioned within the waistpack adapted to be utilized within the light.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide an emergency rescue aid system which has all of the advantages of the prior art rescue aids of known designs and configurations and none of the disadvantages.

It is another object of the present invention to provide a new and improved emergency rescue aid system which may be easily and efficiently manufactured and marketed.

It is further object of the present invention to provide a new and improved emergency rescue aid system which is of durable and reliable constructions.

An even further object of the present invention is to provide a new and improved emergency rescue aid system which is susceptible of a low cost of manufacture with regard to both materials and labor, and which accordingly is then susceptible of low prices of sale to the consuming public, thereby making such emergency rescue aid system economically available to the buying public.

Even still another object of the present invention is to provide a emergency rescue aid system for increasing the safety of outdoor enthusiasts who may be at risk of being lost or injured in remote areas.

Lastly, it is an object of the present invention to provide a new and improved emergency rescue aid system including a waistpack having an open interior with a removable flap and a waistband attached thereto for coupling with a user. At least balloon is positioned within the waistpack. Each balloon includes a netting positionable therearound. A light is positioned within the waistpack and is positionable on the upper extent of each balloon. A reel of wire is provided. The wire having a central electrical power cable, an exterior woven wire and an intermediate electrically insulating shield, adapted to couple at its upper end the light and to be supported on the reel at its lower end. At least one helium container is positioned on the waistpack. The helium container being adapted to fill at least one balloon to effect its rising upon being inflated.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
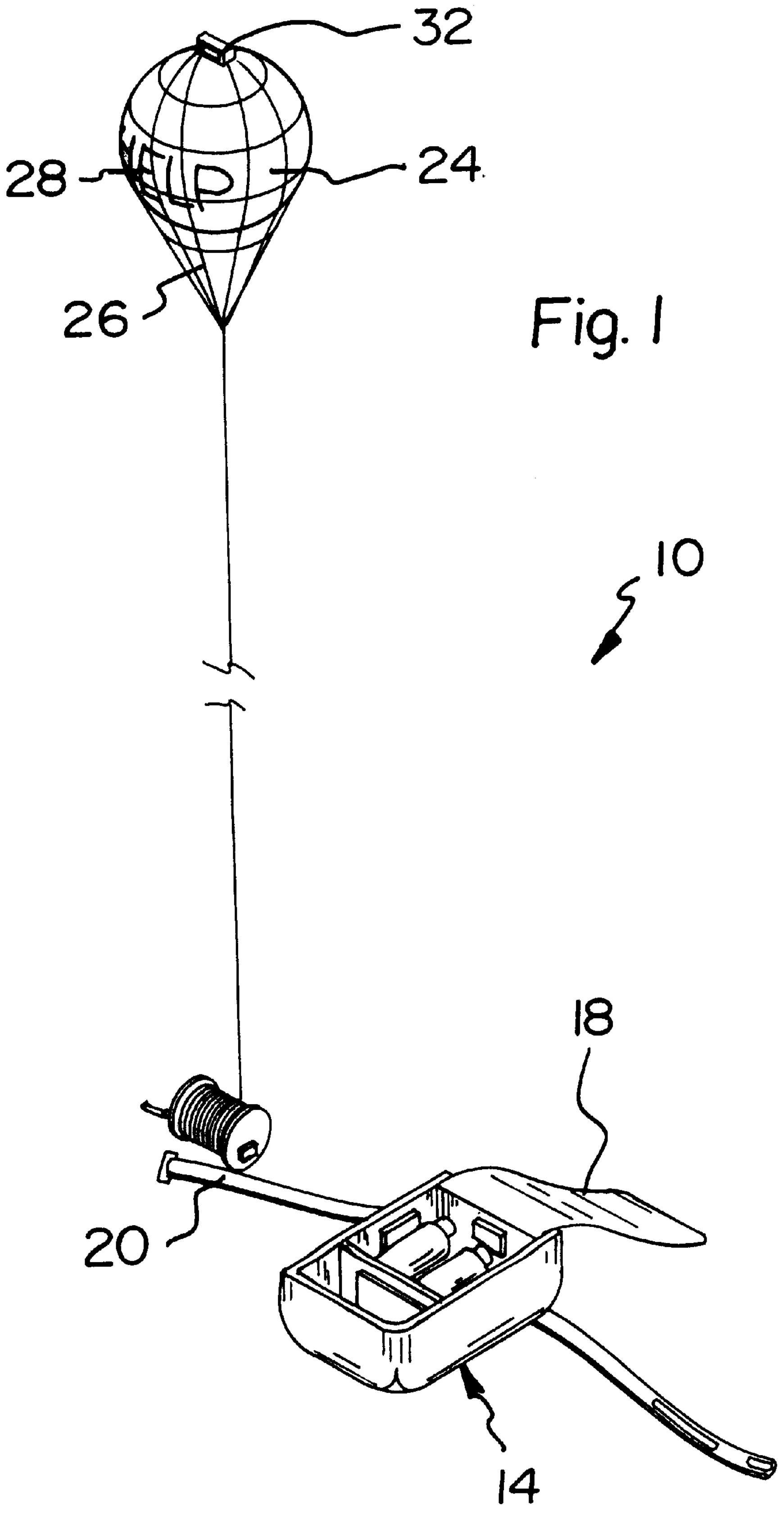
FIG. 1 is a perspective view of the preferred embodiment of the emergency rescue aid system constructed in accordance with the principles of the present invention.
Figure 2:
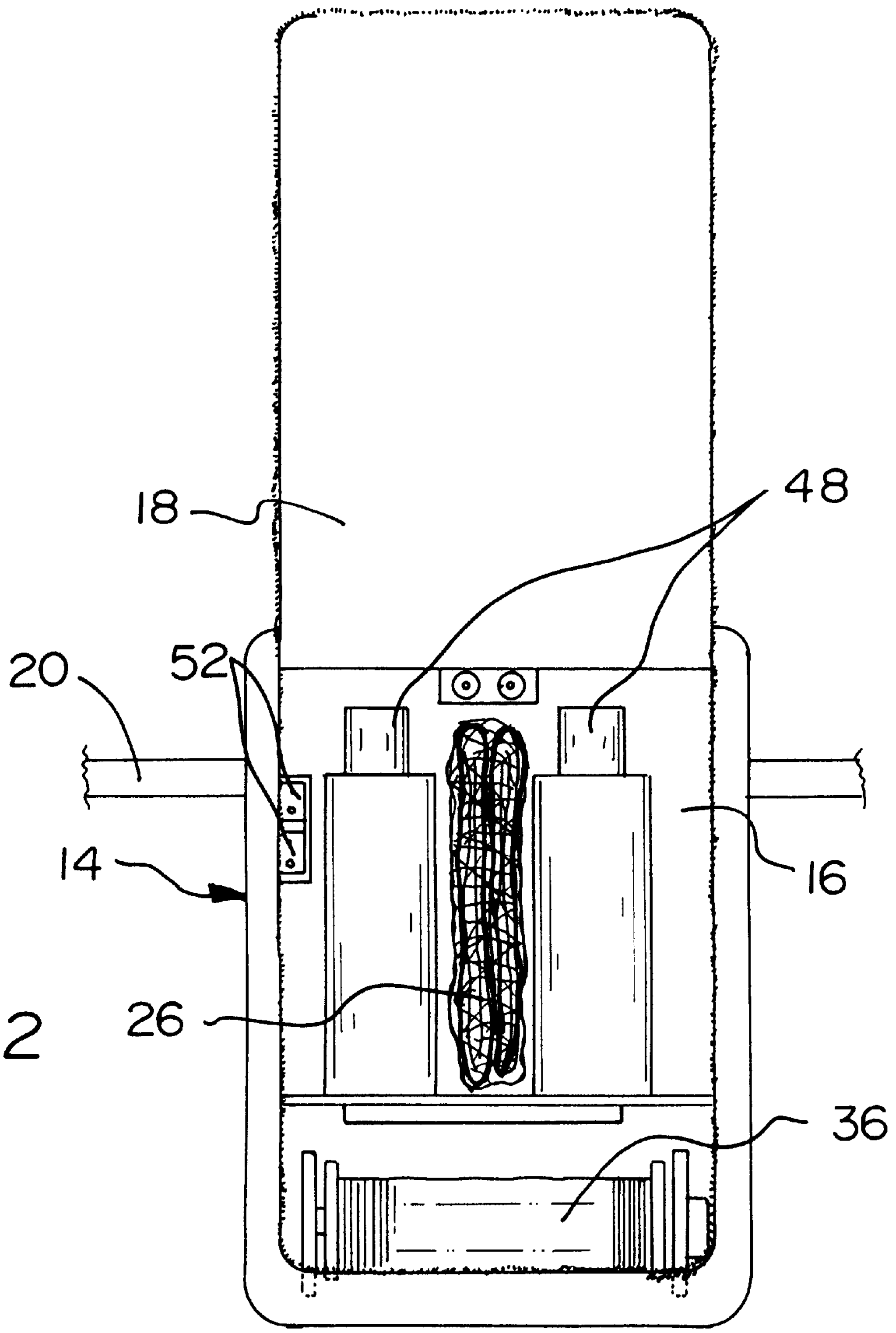
FIG. 2 is a front elevational view of the waistpack shown in FIG. 1.
Figure 3:
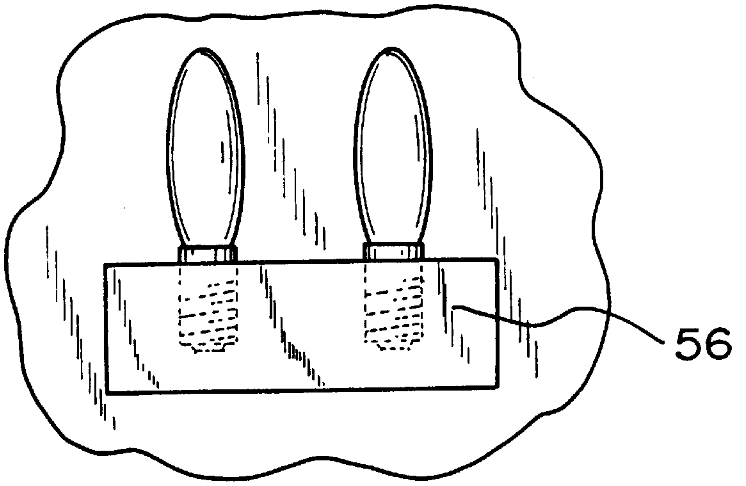
FIG. 3 is an enlarged showing of the lightbulbs illustrated in FIG. 2.
Figure 4:
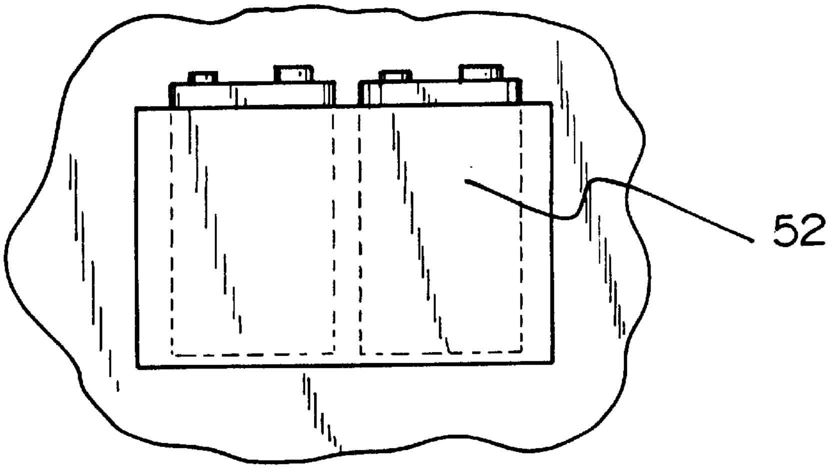
FIG. 4 is an enlarged front elevational view of the extra batteries illustrated in FIG. 2.
Figure 5:
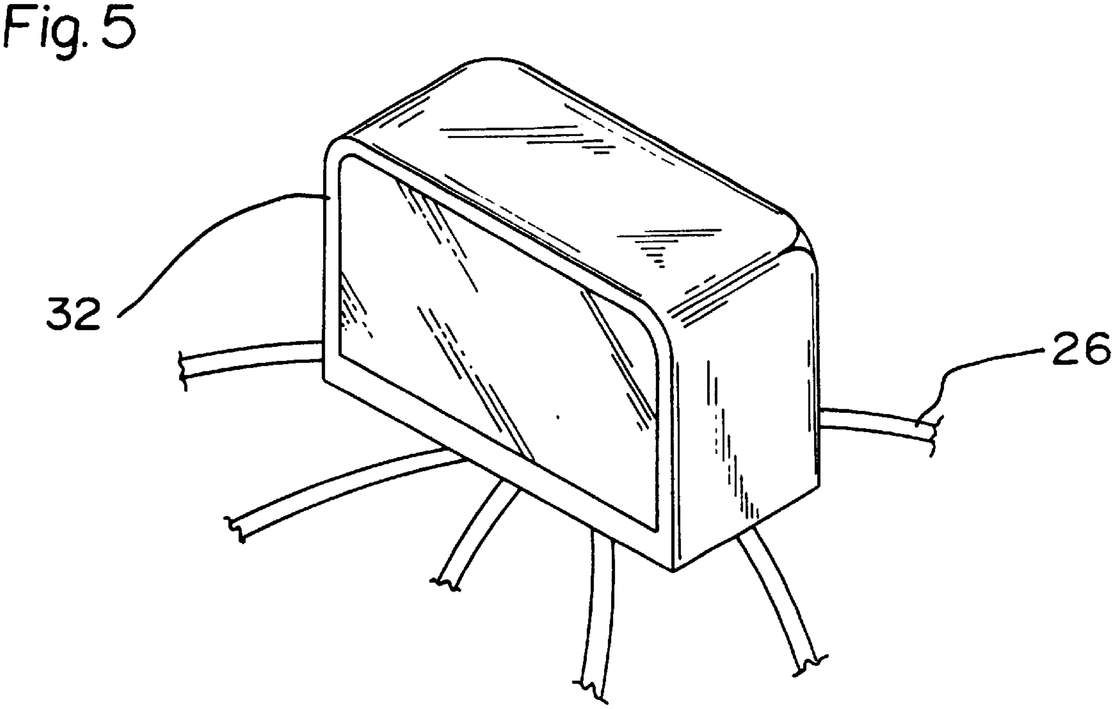
FIG. 5 is a perspective illustration of the top of the balloon shown in FIG. 1.

With reference now to the drawings, and in particular to FIG. 1 thereof, the preferred embodiment of the new and improved emergency rescue aid system embodying the principles and concepts of the present invention and generally designated by the reference numeral 10 will be described.

The present invention, the emergency rescue aid system 10 is comprised of a plurality of components. Such components in their broadest context include a waistpack, a pair of balloons, a halogen or strobe light and a reel of wire. Such components are individually configured and correlated with respect to each other so as to attain the desired objective.

The emergency rescue aid system 10 of the present invention is adapted to be carried by outdoor enthusiasts who may be at risk of being lost or injured in remote areas. The system comprises, in combination a waistpack 14 having an open interior 16 with a removable flap 18 and a waistband 20 attached thereto for coupling with a user.

A pair of balloons 24 are positioned within the waistpack. Each balloon includes a nylon netting 26 which is positionable therearound. Each balloon has indicia 28 thereon of a reflective material to indicate help is needed.

Also provided is a halogen or strobe light 32 positioned within the waistpack and positionable on the upper extent of each balloon.

A reel of wire 36 is provided, the wire having a central electrical power cable 40, an exterior woven wire 42 and an intermediate electrically insulating shield 44. The wire is about 500 feet in length and is adapted to couple at its upper end the light and to be supported on the reel at its lower end.

Also provided are a pair of helium containers 48 positioned on the waistpack. Each helium container is adapted to fill one balloon to effect its rising upon being inflated.

Additionally provided is a pair of batteries 52 positioned within the waistpack, each battery adapted to be coupled to the lower end of the power cable for illuminating the light when the balloon is raised.

Lastly provided is a pair of extra lightbulbs 56 positioned within the waistpack adapted to be utilized in association with the light.

The present invention as described hereinabove is an emergency rescue system to be carried by outdoor enthusiasts who may be at risk of being lost or injured in remote areas. The system provides an easily visible signalling balloon that can be elevated up to 500 feet in the air.

The system is a portable kit that includes brightly colored balloons with indicia in highly reflective material, balloon retaining net with attached signal lamp, two helium containers, reel loaded with tether cord and two batteries.

The system has a carrying pack which can be designed like a backpack or shoulder bag, or in a compact bundle for transporting within a conventional backpack or the gear compartment in a recreational vehicle, automobile or boat.

The system is convenient, lightweight, easy to use and requires no tools for assembly. The user simply inserts one of the balloons into the retaining net as directed, attach and connect the tether cord/electrical wire to the net, connect the battery, inflate the balloon with helium and seal the balloon as directed, test the electrical connection, unlock the reel to allow the balloon to ascend to the desired height and then lock the reel.

Figure 6:
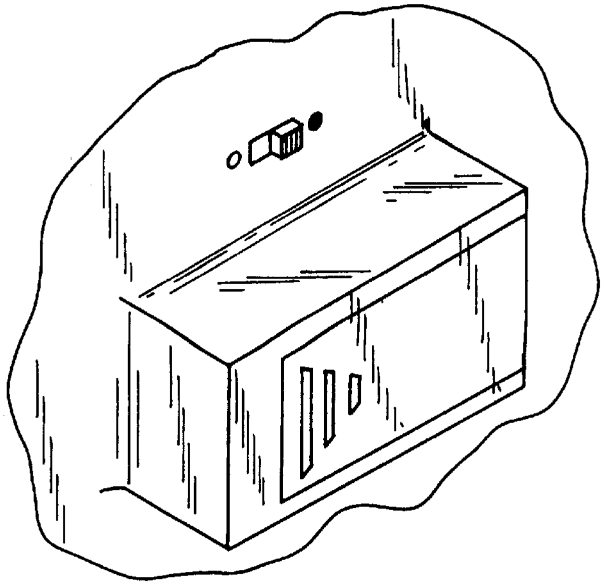
FIG. 6 is a perspective view of the switch and battery box.
Figure 7:
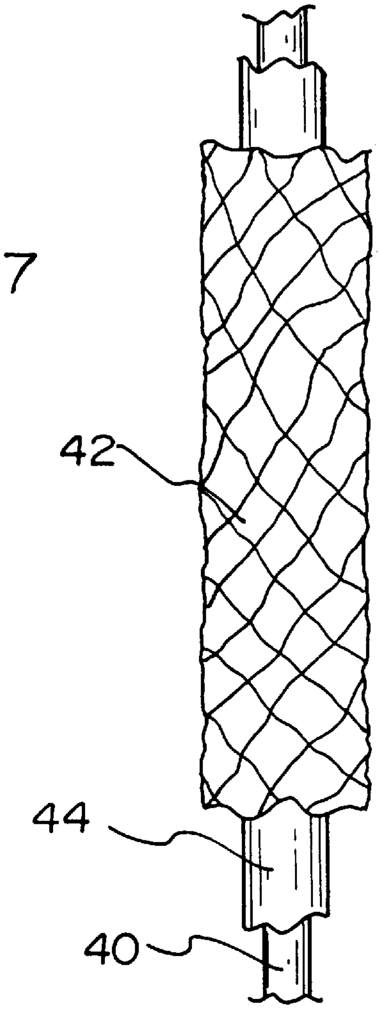
FIG. 7 is an elevational view of the wire shown in FIG. 1 with parts removed to show internal constructions thereof.
Figure 8:
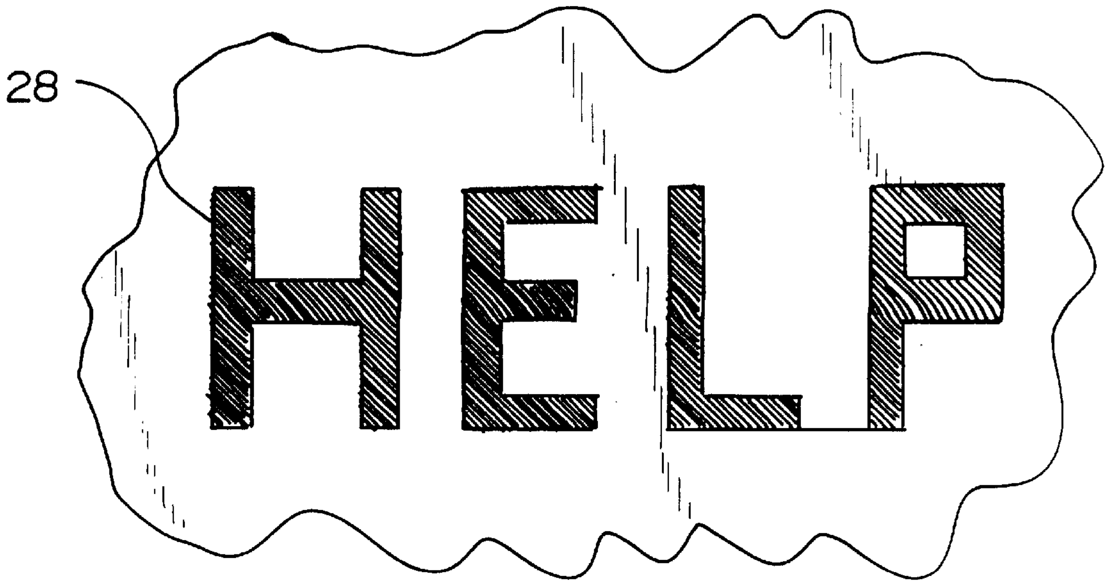
FIG. 8 is an enlarged view of the indicia on the balloon shown in FIG. 1.

As shown in FIG. 6, a battery box supports one of the batteries providing electrical power to the light with an associated switch to allow the power to illuminate the light or to turn off the light as may be required.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An emergency rescue aid system adapted to be carried by outdoor enthusiasts who may be at risk of being lost or injured in remote areas comprising, in combination:

a waistpack having an open interior with a removable flap and a waistband attached thereto for coupling with a user;

a pair of balloons positioned within the waistpack, each balloon having in association therewith a nylon netting positionable therearound, each balloon having indicia thereon of a reflective material to indicate help is needed said nylon netting positioned within the waistpack;

a halogen strobe light positioned within the waistpack and securable on the upper extent of each balloon;

a reel positioned within the waistpack and having wire thereon, the wire having a central electrical power cable interiorly, an exterior woven wire and an intermediate electrically insulating shield, the wire being about 500 feet in length and adapted to couple at its upper end to the light and to be supported on the reel at its lower end;

a pair of helium containers positioned in the waistpack, each helium container adapted to fill one of the balloons to effect its rising upon being inflated;

a pair of batteries positioned within the waistpack, each battery adapted to be coupled to the lower end of the power cable for illuminating the light when an associated one of the balloons is raised; and a pair of extra lightbulbs positioned within the waistpack adapted to be utilized in association with the light.

* * * * *